UNITED STATES PATENT OFFICE.

HERMANN WAGNER AND JOSEF ERBER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYESTUFFS AND PROCESS OF MAKING SAME.

1,041,919.   Specification of Letters Patent.   Patented Oct. 22, 1912.

No Drawing.   Application filed February 23, 1912.   Serial No. 679,374.

*To all whom it may concern:*

Be it known that we, HERMANN WAGNER, Ph. D., chemist, and JOSEF ERBER, Ph. D., chemist, citizens of the Empire of Germany, residing at Höchst-on-the-Main, Germany, have invented certain new and useful Improvements in New Dyestuffs and Processes of Making Same, of which the following is a specification.

This invention relates to the manufacture of dyestuffs by coupling the tetrazo compound of the $2:2^1$-benzidindisulfonic acid with 1-(2-chlorphenyl)-3-methyl-5-pyrazolone, or with 1-(2:5-dichlorphenyl)-3-methyl-5-pyrazolone.

The new dyestuffs have the general constitutional formula:

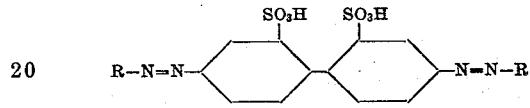

wherein "R" stands for a halogenated pyrazolone. The alkali salts of these dyestuffs form, when dry, yellow powders, readily soluble in water. The dyestuffs are remarkable for their pure yellow tint tending toward green, and are very valuable for dyeing wool as well as for the preparation of color lakes.

The invention is illustrated by the following examples:—

1. The tetrazo compound obtained in the usual manner from 34.4 kilos of $2:2^1$-benzidindisulfonic acid is run into an aqueous solution of 41.7 kilos of 1-(2-chlorphenyl)-3-methyl-5-pyrazolone in caustic soda lye and sodium carbonate. When the reaction is finished, the dyestuff is separated in the usual manner. The coupling may also be effected in an acetic acid solution.

2. The tetrazo compound obtained from 34.4 kilos of $2:2^1$-benzidindisulfonic acid is run into an aqueous solution of 48.6 kilos of 1-(2:5-dichlorphenyl)-3-methyl-5-pyrazolone in caustic soda lye and sodium carbonate. When the reaction is finished, the dyestuff is separated in the usual manner. The coupling may also be effected in an acetic acid solution. This product has the formula:

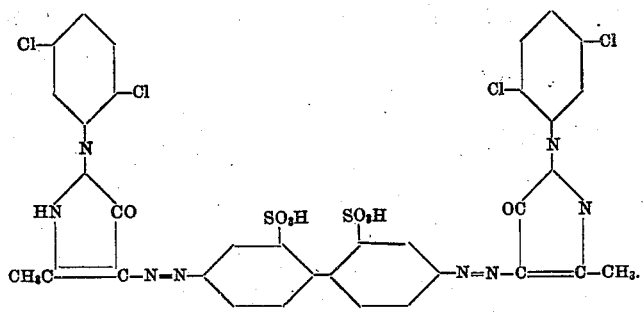

In order to prepare the color lakes, the dyestuff is, for instance, precipitated in an aqueous solution by barium chlorid upon a substratum such, for instance, as heavy spar or aluminium hydroxid. Thus color-lakes of pure yellow, bright tints are obtained.

Having now described our invention, what we claim, is—

1. As new products, the herein-described dyestuffs of the general formula:—

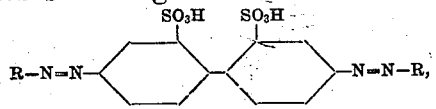

wherein "R" stands for a halogenated pyrazolone, the alkali salts of which, when dry, form yellow powders, readily soluble in water, dyeing wool pure yellow tints with a green hue and being very suitable for the preparation of color-lakes.

2. As a new product, the herein-described dyestuff of the formula:

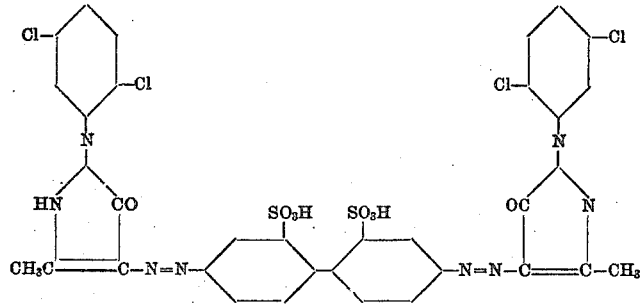

the alkali salts of which, when dry, form a yellow powder, readily soluble in water, dyeing wool a pure yellow tint with a green hue, and being very suitable for the preparation of color lakes.

3. The process of manufacturing yellow dyestuffs, which consists in diazotizing benzidin-m-disulfonic acid and coupling it with a halogenated pyrazolone.

In testimony whereof, we affix our signatures in presence of two witnesses.

HERMANN WAGNER.
JOSEF ERBER.

Witnesses:
JEAN GRUND,
CARL GRUND.